(No Model.)

A. L. MITCHELL.
NUT LOCK.

No. 320,270. Patented June 16, 1885.

WITNESSES:
O. H. Morgan
A. P. Thayer

INVENTOR:
Adolph L. Mitchell,
By A. P. Thayer
atty

United States Patent Office.

ADOLPH L. MITCHELL, OF BROOKLYN, NEW YORK.

NUT-LOCK.

SPECIFICATION forming part of Letters Patent No. 320,270, dated June 16, 1885.

Application filed March 6, 1885. (No model.)

*To all whom it may concern:*

Be it known that I, ADOLPH L. MITCHELL, a citizen of the United States, residing at Brooklyn, in the county of Kings and State of New York, have invented new and useful Improvements in Nut-Lock, of which the following is a specification.

My invention consists of an elastic washer for a nut-lock, composed of an elastic or yielding core of vulcanized fiber, rubber, leatheroid, or equivalent material interposed between two metallic washers having interlocking flanges to inclose the edges of the elastic core for protection and for connecting the upper washer with the lower one to prevent the upper one from turning by the friction of the lower one, the said metallic washers having the flanges on the outer edge only, or on both the outer and inner edges, as preferred, or as may be required by the different kinds of material used for the elastic core. For instance, when vulcanized fiber is used for the elastic core, only the outer flanges of the metallic washers are required, because of its greater resistance; but for rubber cores, which spread more than the vulcanized fiber, I prefer to construct the metallic washers with interlocking flanges on the inner edges also, to control the inward movement of the elastic core as well as the outward, all as hereinafter fully described, reference being made to the accompanying drawings, in which—

Figure 1:
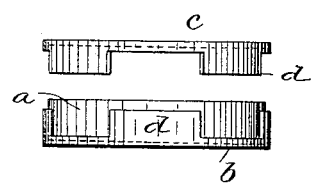
Figure 2:
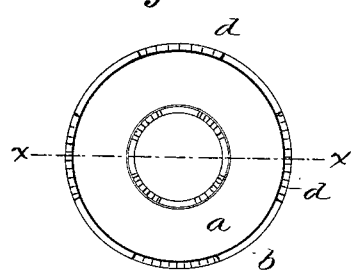
Figure 3:
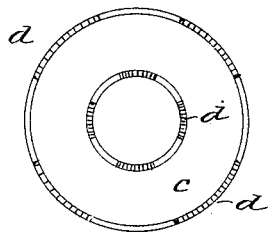
Figure 4:
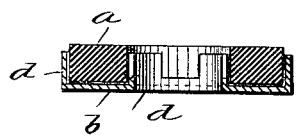
Figure 5:
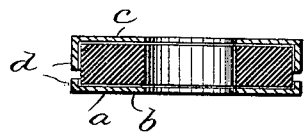

Figure 1 is a side elevation of my improved nut-lock with the upper metallic washer raised off the rest. Fig. 2 is a plan view of the elastic washer and the lower metallic washer. Fig. 3 is a plan view of the upper metallic washer inverted. Fig. 4 is a section of Fig. 2 on line $x\ x$, and Fig. 5 is a vertical transverse section of the device without the inner flanges of the metallic washers.

The elastic core $a$ is a simple washer, of vulcanized fiber, rubber, leatheroid, or other such material of elastic nature, but adapted to resist the compression of bolts and nuts with sufficient power to retain the requisite elasticity for preventing the slackness that allows the nuts to work loose. The metallic washers $b$ and $c$ are the same as ordinary washers, with the addition of the sectional or notched interlocking flanges $d$, whereof the projections of one flange mesh with the notches of the other, said flanges to be on the outer edges only, or on both outer and inner edges for the protection of the elastic cores, also for limiting the lateral spread of the elastic core by compression, but more especially for connecting the washer under the nut with the one that bears against the fish-plate, to utilize the friction of the latter to prevent the turning of the one on which the nut bears. These metallic washers may, if desired, be made of wrought-iron by drop-forging; but it will probably be preferable to make them of cast malleable iron or steel.

By the use of the interlocking flanges, which are enabled to be of like dimensions radially in consequence of being interlocking, the elastic washer fits alike and accurately in both metallic washers, and is therefore confined uniformly at both lower and upper edges, which cannot be the case when the flange of one washer fits within the flange of the other, which makes slack between the elastic washer and the larger metallic washer that allows the elastic washer to spread or expand laterally thereat more than elsewhere, which inequality of action causes disintegration of the elastic washer much sooner than when uniformity of action is insured by uniformity of the bearing of the elastic washer in both flanges of the metallic washers.

Besides this advantage of the interlocking flanges, the same contrivance makes the requisite connections of the two washers for preventing the turning of the upper metallic washer by the nut and the consequent torsion of the elastic washer without other special connection of the flanges of the two metallic washers.

In this arrangement the elastic washer fits in the flanges of both the metallic washers sufficiently tight to need no other connection for holding the parts together prior to being used.

The notches and projections of the flanges of the metallic washers may extend the whole depth of the flanges or a little less, as preferred; but the flanges must be as much less in depth as the elastic washer is to be compressed.

What I claim, and desire to secure by Letters Patent, is—

An elastic or yielding washer covered with two metal washers having interlocking flanges, substantially as described.

In witness whereof I have hereunto signed my name in the presence of two subscribing witnesses.

ADOLPH L. MITCHELL.

Witnesses:
W. J. MORGAN,
A. P. THAYER.